United States Patent
Ettinger et al.

(10) Patent No.: US 11,747,150 B2
(45) Date of Patent: *Sep. 5, 2023

(54) ROUTING DEVICE THAT MODIFIES ROUTE GUIDANCE BASED ON USER INPUT

(71) Applicant: Uber Technologies, Inc., San Francisco, CA (US)

(72) Inventors: Esther Abramovich Ettinger, Laguna Beach, CA (US); Gil Emanuel Fuchs, Nes Tziona (IL)

(73) Assignee: Uber Technologies, Inc., San Francisco, CA (US)

( * ) Notice: Subject to any disclaimer, the term of this patent is extended or adjusted under 35 U.S.C. 154(b) by 493 days.

This patent is subject to a terminal disclaimer.

(21) Appl. No.: 16/946,804

(22) Filed: Jul. 7, 2020

(65) Prior Publication Data

US 2020/0408544 A1    Dec. 31, 2020

Related U.S. Application Data

(63) Continuation of application No. 16/059,969, filed on Aug. 9, 2018, now Pat. No. 10,739,148, which is a continuation of application No. 15/003,831, filed on Jan. 22, 2016, now Pat. No. 10,066,950, which is a continuation of application No. 14/054,320, filed on Oct. 15, 2013, now Pat. No. 9,243,920.

(60) Provisional application No. 61/716,321, filed on Oct. 19, 2012.

(51) Int. Cl.
*G01C 21/34* (2006.01)
*G01C 21/36* (2006.01)

(52) U.S. Cl.
CPC ........ *G01C 21/3415* (2013.01); *G01C 21/34* (2013.01); *G01C 21/3484* (2013.01); *G01C 21/3641* (2013.01); *G01C 21/3667* (2013.01); *G01C 21/3691* (2013.01)

(58) Field of Classification Search
CPC ............... G01C 21/34; G01C 21/3415; G01C 21/3484; G01C 21/3641; G01C 21/3667; G01C 21/3691
See application file for complete search history.

(56) References Cited

U.S. PATENT DOCUMENTS

| | | |
|---|---|---|
| 4,974,170 A | 11/1990 | Bouve et al. |
| 5,470,233 A | 11/1995 | Fruchterman et al. |
| 5,682,525 A | 10/1997 | Bouve et al. |

(Continued)

FOREIGN PATENT DOCUMENTS

| | | |
|---|---|---|
| WO | 2005098362 | 10/2005 |
| WO | 2007041547 | 4/2007 |

OTHER PUBLICATIONS

"U.S. Appl. No. 15/003,831, Final Office Action dated Apr. 19, 2017", 13 pgs.

(Continued)

*Primary Examiner* — Anshul Sood
(74) *Attorney, Agent, or Firm* — SCHWEGMAN LUNDBERG & WOESSNER, P.A.

(57) ABSTRACT

A vehicle routing device that determines a route from an origin to a destination including route guidance. The route guidance is modified based on user input. The modification can supply increased or reduced route guidance at intervals along the route. Route guidance may be modified to incorporate landmarks and personal contacts.

20 Claims, 5 Drawing Sheets

(56) References Cited

U.S. PATENT DOCUMENTS

| | | |
|---|---|---|
| 5,784,059 A | 7/1998 | Morimoto et al. |
| 6,115,669 A | 9/2000 | Watanabe et al. |
| 6,339,746 B1 | 1/2002 | Sugiyama et al. |
| 6,427,118 B1 | 7/2002 | Suzuki |
| 6,510,379 B1 | 1/2003 | Hasegawa et al. |
| 6,636,805 B1 | 10/2003 | Tada et al. |
| 6,728,635 B2 | 4/2004 | Hamada et al. |
| 6,820,005 B2 | 11/2004 | Matsuda et al. |
| 6,944,539 B2 | 9/2005 | Kamada et al. |
| 7,333,889 B2 | 2/2008 | Hashizume |
| 7,395,153 B1 | 7/2008 | Nesbitt et al. |
| 7,463,972 B2 | 12/2008 | Yamada et al. |
| 7,487,038 B2 | 2/2009 | Kitagawa et al. |
| 7,487,039 B2 | 2/2009 | Rumbo et al. |
| 7,532,899 B2 | 5/2009 | Wilson et al. |
| 7,598,321 B2 | 10/2009 | Talkowski |
| 7,831,381 B2 | 11/2010 | Thota |
| 7,933,897 B2 | 4/2011 | Jones et al. |
| 7,957,871 B1 | 6/2011 | Echeruo |
| 8,688,367 B2 | 4/2014 | Mauderer |
| 9,243,920 B2 | 1/2016 | Ettinger et al. |
| 10,066,950 B2 | 9/2018 | Ettinger et al. |
| 10,739,148 B2 | 8/2020 | Ettinger et al. |
| 2001/0007968 A1 | 7/2001 | Shimazu |
| 2002/0022923 A1 | 2/2002 | Hirabayashi et al. |
| 2002/0103599 A1 | 8/2002 | Sugiyama et al. |
| 2002/0120397 A1 | 8/2002 | Kepler |
| 2004/0167706 A1 | 8/2004 | Becker |
| 2004/0192311 A1 | 9/2004 | Koskinen et al. |
| 2004/0205394 A1 | 10/2004 | Plutowski |
| 2004/0254723 A1 | 12/2004 | Tu |
| 2005/0065779 A1 | 3/2005 | Ddinak |
| 2005/0227676 A1 | 10/2005 | De Vries |
| 2005/0256635 A1 | 11/2005 | Gardner et al. |
| 2006/0069503 A1 | 3/2006 | Suomela et al. |
| 2006/0157621 A1 | 7/2006 | Santos Rubio et al. |
| 2007/0016368 A1 | 1/2007 | Chapin et al. |
| 2007/0078596 A1 | 4/2007 | Grace |
| 2007/0078598 A1 | 4/2007 | Watanabe et al. |
| 2007/0106469 A1 | 5/2007 | Ishizaki |
| 2007/0115142 A1 | 5/2007 | Nakashima |
| 2007/0125967 A1 | 6/2007 | Lapanik et al. |
| 2007/0143345 A1 | 6/2007 | Jones et al. |
| 2007/0299607 A1 | 12/2007 | Cubillo |
| 2008/0109718 A1 | 5/2008 | Narayanaswami |
| 2008/0140310 A1 | 6/2008 | Graef |
| 2008/0147319 A1 | 6/2008 | Cubillo |
| 2008/0195312 A1 | 8/2008 | Aaron et al. |
| 2008/0262714 A1 | 10/2008 | Abramovich Ettinger |
| 2008/0262717 A1 | 10/2008 | Ettinger |
| 2008/0319652 A1 | 12/2008 | Moslifeghi |
| 2008/0319658 A1 | 12/2008 | Horvitz et al. |
| 2008/0319659 A1 | 12/2008 | Horvitz et al. |
| 2008/0319660 A1 | 12/2008 | Horvitz et al. |
| 2009/0005981 A1 | 1/2009 | Forstall et al. |
| 2009/0164115 A1* | 6/2009 | Kosakowski ........ G01C 21/367 701/533 |
| 2009/0222201 A1 | 9/2009 | Jung |
| 2009/0281726 A1 | 11/2009 | Byrne et al. |
| 2010/0094536 A1 | 4/2010 | Lee et al. |
| 2010/0324818 A1 | 12/2010 | Gellatly et al. |
| 2012/0197690 A1 | 8/2012 | Agulnek |
| 2013/0322634 A1* | 12/2013 | Bennett ................... H04R 5/04 704/274 |
| 2014/0358425 A1 | 12/2014 | Seth et al. |
| 2016/0138927 A1 | 5/2016 | Ettinger et al. |
| 2018/0364057 A1 | 12/2018 | Ettinger et al. |

OTHER PUBLICATIONS

"U.S. Appl. No. 11/785,284, Non Final Office Action dated Sep. 24, 2009", 8 pgs.
"U.S. Appl. No. 11/785,284, Non Final Office Action dated Jun. 28, 2010", 7 pgs.
"U.S. Appl. No. 11/785,284, Non Final Office Action dated Oct. 14, 2010", 7 pgs.
"U.S. Appl. No. 11/785,284, Final Office Action dated Apr. 28, 2011", 6 pgs.
"U.S. Appl. No. 11/785,284, Final Office Action dated Jan. 30, 2014", 13 pgs.
"U.S. Appl. No. 11/785,294, Non Final Office Action dated Aug. 19, 2010", 12 pgs.
"U.S. Appl. No. 11/785,294, Final Office Action dated Mar. 7, 2011", 20 pgs.
"U.S. Appl. No. 11/785,294, Non Final Office Action dated Jun. 21, 2012", 18 pgs.
"U.S. Appl. No. 11/785,294, Final Office Action dated Feb. 26, 2013", 22 pgs.
"U.S. Appl. No. 11/785,294, Non Final Office Action dated Dec. 19, 2013", 7 pgs.
"U.S. Appl. No. 11/785,284, Non Final Office Action dated Jan. 16, 2015", 15 pgs.
"U.S. Appl. No. 14/054,320, Non Final Office Action dated Aug. 29, 2014", 9 pgs.
"U.S. Appl. No. 14/054,320, Response filed Nov. 26, 2014 to Non Final Office Action dated Aug. 29, 2014", 15 pgs.
"U.S. Appl. No. 14/054,320, Final Office Action dated Feb. 11, 2015", 11 pgs.
"U.S. Appl. No. 14/054,320, Response filed May 6, 2015 to Final Office Action dated Feb. 11, 2015", 15 pgs.
"U.S. Appl. No. 14/054,320, Non Final Office Action dated May 29, 2015", 8 pgs.
"U.S. Appl. No. 14/054,320, Response filed Aug. 31, 2015 to Non Final Office Action dated May 29, 2015", 16 pgs.
"U.S. Appl. No. 14/054,320, Notice of Allowance dated Sep. 15, 2015", 7 pgs.
"U.S. Appl. No. 15/003,831, Non Final Office Action dated Aug. 23, 2016", 11 pgs.
"U.S. Appl. No. 15/003,831, Response filed Feb. 20, 2017 to Non Final Office Action dated Aug. 23, 2016", 8 pgs.
"U.S. Appl. No. 15/003,831, Response filed Sep. 19, 2017 to Final Office Action dated Apr. 19, 2017", 13 pgs.
"U.S. Appl. No. 15/003,831, Examiner Interview Summary dated Sep. 19, 2017", 2 pgs.
"U.S. Appl. No. 15/003,831, Non Final Office Action dated Oct. 25, 2017", 13 pgs.
"U.S. Appl. No. 15/003,831 Response filed Mar. 23, 2018 to Non-Final Office Action dated Oct. 26, 2017.pdf", 12 pgs.
"U.S. Appl. No. 15/003,831, Notice of Allowance dated May 10, 2018", 8 pgs.
"U.S. Appl. No. 16/059,969, Non Final Office Action dated Aug. 16, 2019", 6 pgs.
"U.S. Appl. No. 16/059,969, Response filed Jan. 16, 2020 to Non Final Office Action dated Aug. 16, 2019", 11 pgs.
"U.S. Appl. No. 16/059,969, Notice of Allowance dated Mar. 30, 2020", 8 pgs.
"U.S. Appl. No. 16/059,969, Supplemental Notice of Allowability dated Jul. 16, 2020", 2 pgs.
Caduff, David, "The Landmark Spider: Representing Landmark Knowledge for Wayfinding Tasks", American Association for Artificial Intelligence (www.aaai.org), (2002), 1-6.
Ruetschi, Urs-Jakob, "Routing by Landmarks", 6th Swiss Transport Research Conference, Monte Verita Ascona, (Mar. 15-17, 2006).

* cited by examiner

ROUTING DEVICE THAT MODIFIES ROUTE GUIDANCE BASED ON USER INPUT

CLAIM OF PRIORITY

This application is a continuation of and claims the benefit of priority to U.S. patent application Ser. No. 14/054,320 filed on 2013 Oct. 15 titled "SYSTEM AND METHOD FOR ADAPTING THE ROUTING INFORMATION PROVIDED BY A MAPPING OR ROUTING DEVICE" which in turn claims priority to U.S. Provisional patent application titled "SYSTEM AND METHOD FOR ADAPTING THE ROUTING INFORMATION PROVIDED BY A MAPPING OR ROUTING DEVICE", Application No. 61/716,321, filed 2012 Oct. 19; which application are herein incorporated by reference.

CROSS-REFERENCE TO RELATED APPLICATIONS

This application is related to U.S. patent application titled "DEVICE, SYSTEM AND METHOD OF CONTACT-BASED ROUTING AND GUIDANCE", application Ser. No. 11/785,284, filed Apr. 17, 2007; and U.S. patent application titled "DEVICE, SYSTEM AND METHOD OF LANDMARK-BASED ROUTING AND GUIDANCE", application Ser. No. 11/785,294, filed Apr. 17, 2007, each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to systems for mapping and route guidance, and are particularly related to a system and method for adapting the routing information provided by a mapping or routing device.

BACKGROUND

A typical mapping or routing device (e.g., an in-car global positioning system (GPS), or a handheld smartphone device that includes a mapping software) can be used to display a map of a geographical area selected by a user, and provide routing information, such as driving directions that the user can follow to drive from a first geographical location (origin), to a second geographical location (destination).

In some instances, the routing information can include a graphical component (e.g., a graphical representation of a suggested driving route displayed in combination with a graphical map), coupled with a textual or audio component (e.g., directions to the user on how to drive in order to reach the destination, such as "Drive north on Broadway for a distance of one mile", "Turn right at the corner of 37th Street", or the like).

However, a problem with current mapping or routing devices is that they generally operate independently of a user's/driver's familiarity with a particular geographical area, and as such are not designed to adapt accordingly. This is the general area that embodiments of the invention are designed to address.

SUMMARY

Described herein is a system and method for adapting the routing information provided by a mapping or routing device. In accordance with an embodiment the system comprises a data collection component (e.g., one or more GPS, accelerometer, or other means of determining location and/or movement), and a route calculation logic that can use information about a first geographical location (origin), and a second geographical location (destination), to calculate a routing information, such as driving directions that a user can follow to drive from the origin to the destination. An information filtering application adapts the amount of information that will be presented to the user at a particular location, moment in time, or based on other criteria. In accordance with an embodiment, the information filtering application can, in some instances, be provided as a third-party application; for example, in the case of a mapping/routing device incorporated into a smartphone device that includes a mapping software, the information filtering application can be provided as a downloadable or otherwise installable third-party software application that can be installed into the smartphone device and used to adapt the routing information the device provides to a user.

DETAILED DESCRIPTION

Figure 1:
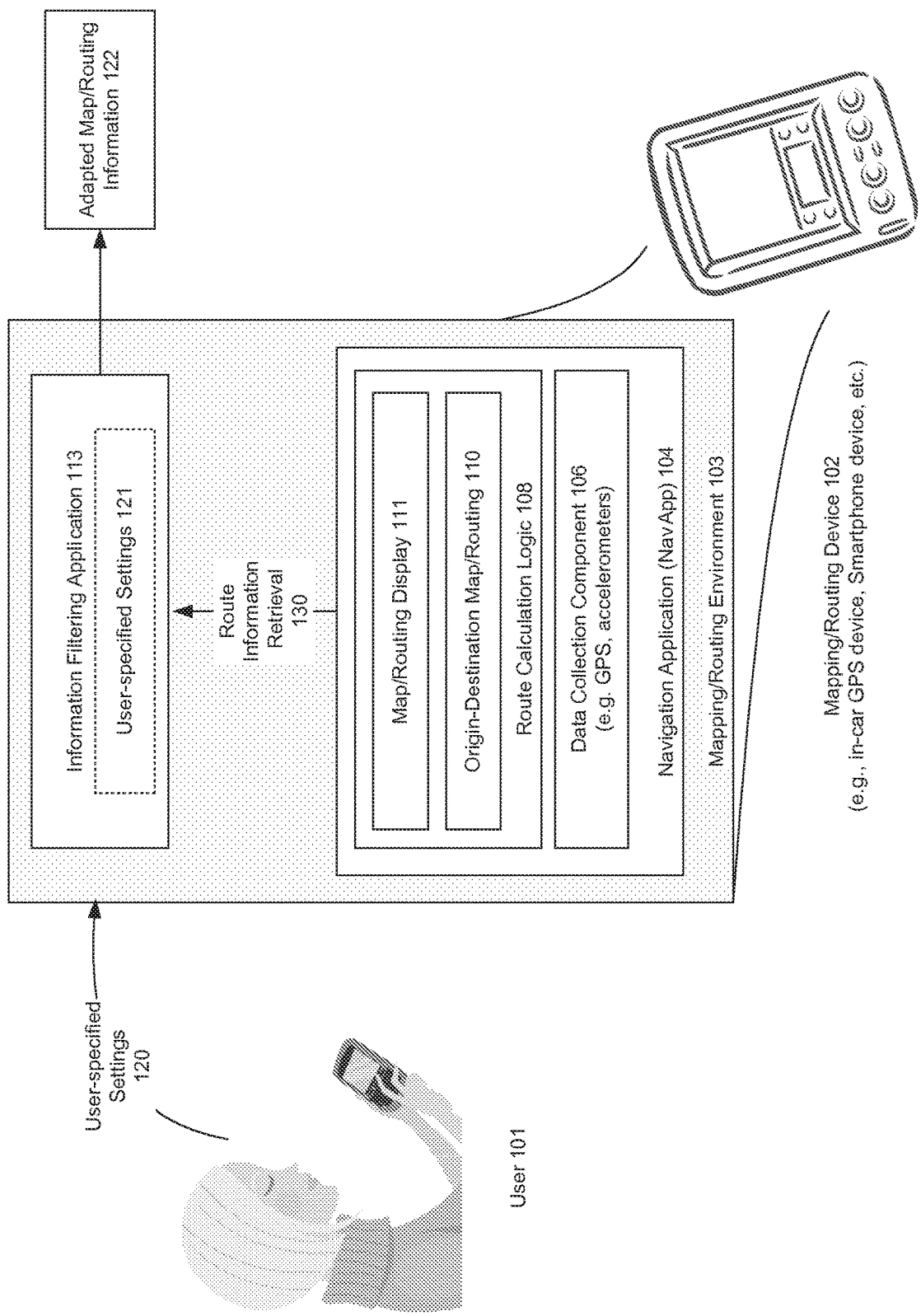
FIG. 1 illustrates a system for adapting the routing information provided by a mapping or routing device, in accordance with an embodiment.

As described above, a typical mapping or routing device (e.g. an in-car global positioning system (GPS), or a handheld smartphone device that includes a mapping software) can be used to display a map of a geographical area selected by a user, and provide routing information, such as driving directions that the user can follow to drive from a first geographical location (origin), to a second geographical location (destination). However, a problem with current mapping or routing devices is that they generally operate independently of a user's/driver's familiarity with a particular geographical area, and as such are not designed to adapt accordingly.

Embodiments of the invention are generally related to systems for mapping and route guidance, and are particularly related to a system and method for adapting the routing information provided by a mapping or routing device. In accordance with an embodiment, the system comprises a data collection component (e.g., one or more GPS, accelerometer, or other means of determining location and/or movement), and a route calculation logic that can use information about the origin and the destination, to calculate a routing information, such as driving directions that a user can follow to drive from the origin to the destination.

In accordance with an embodiment, an information filtering application, which in some instances can be provided as a third-party application, can, based on a user-specified setting, determine the type or how much routing information the system should provide to the user. For example, a "volume" or "slider" type control, or an "expert" software setting, or other means, can be provided to allow the user to instruct the system to provide more or less routing information in appropriate circumstances. Such settings can be manually or directly modified by the user, or can be automatically determined by an external application based on various criteria.

By way of illustration, the settings can be used to instruct the system that routing information be turned off, with no routing information provided; or alternatively that routing information be turned on, with a reduced level of routing information provided; or alternatively that routing information be turned on, with a full level of routing information provided; or another level of adapted map/routing information. Adjusting the level of routing information is akin to adjusting the volume of detail provided to the user, from no detail to all available detail. A special case of the above is for the system to completely turn off the providing of routing information, say for a particular portion of a route, and then to turn on all routing information for another portion of the route.

In accordance with an embodiment, the user-specified settings can specify that the routing information remain at a particular level, e.g., for a particular environment or user. Alternatively, the settings can specify that the routing information should vary for the particular environment or user according to e.g., the user's current location/address when compared to the destination, or the user's lat/long position, or a time value such as when the user is within, e.g., 10 minutes from their destination; or when the user has traveled a particular percentage, e.g., 80% along a particular routing path toward the destination.

When, according to the settings and the determination of the above criteria, the system determines that a reduced level of routing information should be provided, say because the user is familiar with the general location, and is far away from their destination, then, in accordance with an embodiment, the system can provide a reduced level of routing information, or in the special case described above, routing information can be turned off completely for a time period.

Subsequently, when, according to the settings and a determination of the above criteria, the system determines that an increased level of routing information should be provided, say because the user is nearing their destination, then, in accordance with an embodiment, the system can provide a correspondingly increased, or full level of routing information.

Although the above embodiments generally describe that the user/vehicle's current location, time and/or other criteria is used by the route calculation logic to provide an adapted map/routing information, in accordance with various embodiments the route calculation logic can alternatively or additionally use personal contacts information and/or landmark information, such as that described respectively in U.S. patent application titled "DEVICE, SYSTEM AND METHOD OF CONTACT-BASED ROUTING AND GUIDANCE", application Ser. No. 11/785,284, filed Apr. 17, 2007; and U.S. patent application titled "DEVICE, SYSTEM AND METHOD OF LANDMARK-BASED ROUTING AND GUIDANCE", application Ser. No. 11/785,294, filed Apr. 17, 2007, herein incorporated by reference.

FIG. 1 illustrates a system for adapting the routing information provided by a mapping or routing device, in accordance with an embodiment. As shown in FIG. 1, a mapping/routing device 102 can be provided as, e.g., an in-car GPS device, a suitably-equipped smartphone device, or another type of mapping/routing device.

In accordance with an embodiment, the mapping/routing device provides a mapping/routing environment 103, which includes a navigation application (navapp) 104 having a data collection component 106 (e.g., one or more GPS, accelerometers, or other means of determining the location and movement of the user), together with a route calculation logic 108 that can use information about a first geographical location (origin), and a second geographical location (destination), in combination with the data collection component, to calculate a routing information, such as driving directions that the user can follow to drive from the origin to the destination. The route calculation logic can include an origin-destination map routing component 110 that calculates a routing information, such as a map/routing display 111, from the origin to the destination.

In accordance with an embodiment, an information filtering application 113 can be provided to adapt the amount of information that will be presented by the system to the user, including an adapted map/routing display. In accordance with an embodiment, the information filtering application can be provided as a third-party application. For example, in the case of a mapping/routing device incorporated into a smartphone device that includes a mapping software, the information filtering application can be provided as a downloadable or otherwise installable third-party software application that can be installed into the smartphone device and used to adapt the routing information the device provides to a user.

In accordance with an embodiment, a user 101 can specify a setting 120 (such as the use of a "volume" or "slider" type control, or an "expert" software setting), which is used by the information filtering application, to configure 121 and thereafter adapt the amount of map/routing information originally provided 130 by the navapp, and present it instead as adapted map/routing information 122 to the user at a particular location, moment in time, or based on other criteria as described in further detail below.

In accordance with an embodiment, the information filtering application (e.g., third-party application) thereafter adapts the level of routing information provided by the navapp, e.g., by giving the appearance that the navapp has "gone to sleep" and is then woken up at a particular location, as specified by the configuration as, e.g., a latlong, street address, distance from destination, time from destination, or other criteria.

Figure 2:
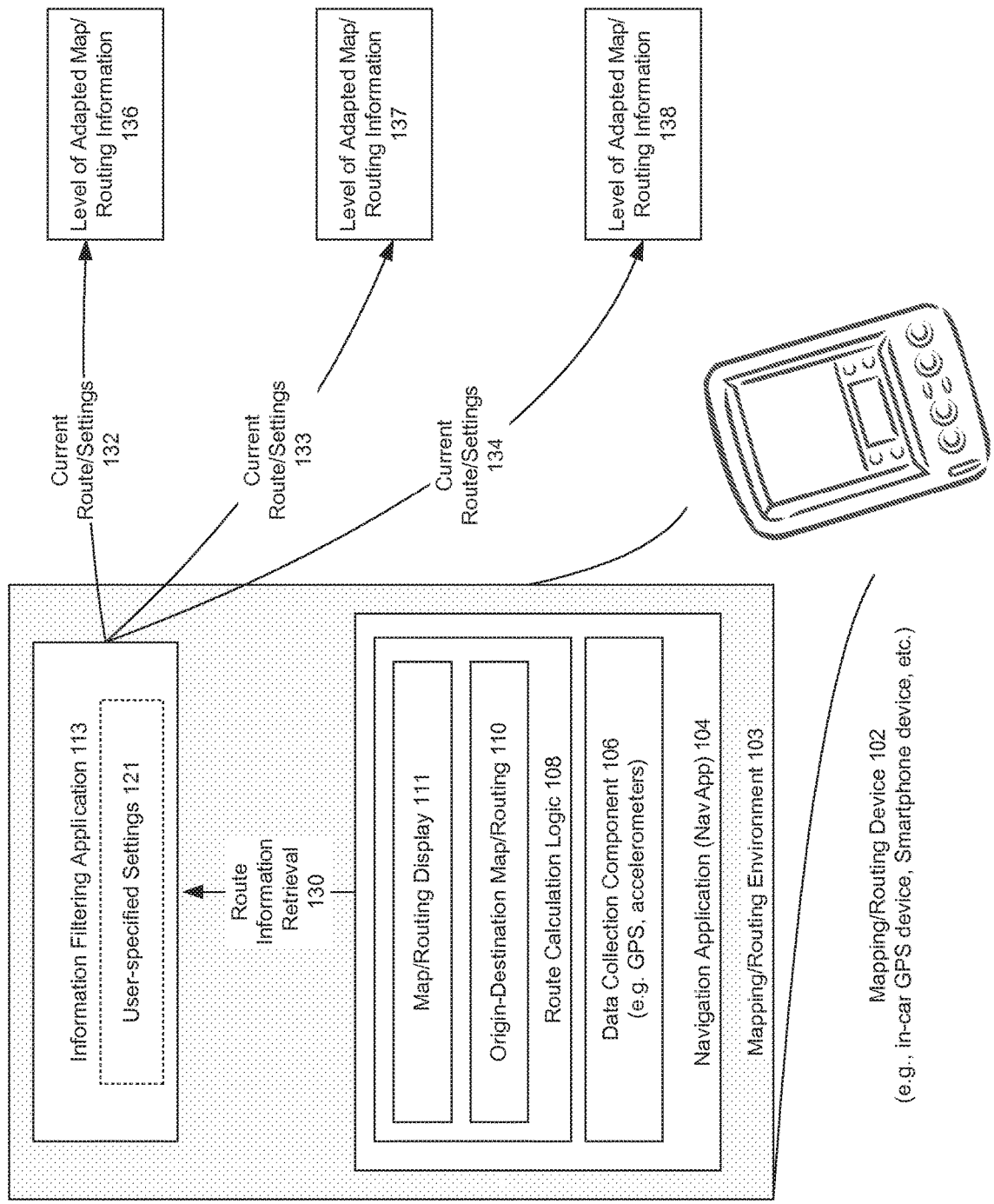
FIG. 2 further illustrates a system for adapting the routing information provided by a mapping or routing device, in accordance with an embodiment.

FIG. 2 further illustrates a system for adapting the routing information provided by a mapping or routing device, in accordance with an embodiment. As shown in FIG. 2, the information filtering application can adapt the amount of map/routing information originally provided by the navapp, and present it instead as different levels of adapted map/routing information 136, 137, 138, to the user at different, e.g., locations or moments in time 132, 133, and 134. In accordance with an embodiment, exceptions can be made for unusual circumstances, e.g., in the event of an unusual traffic situation the level of adapted map/routing information may be temporarily increased.

Figure 3:
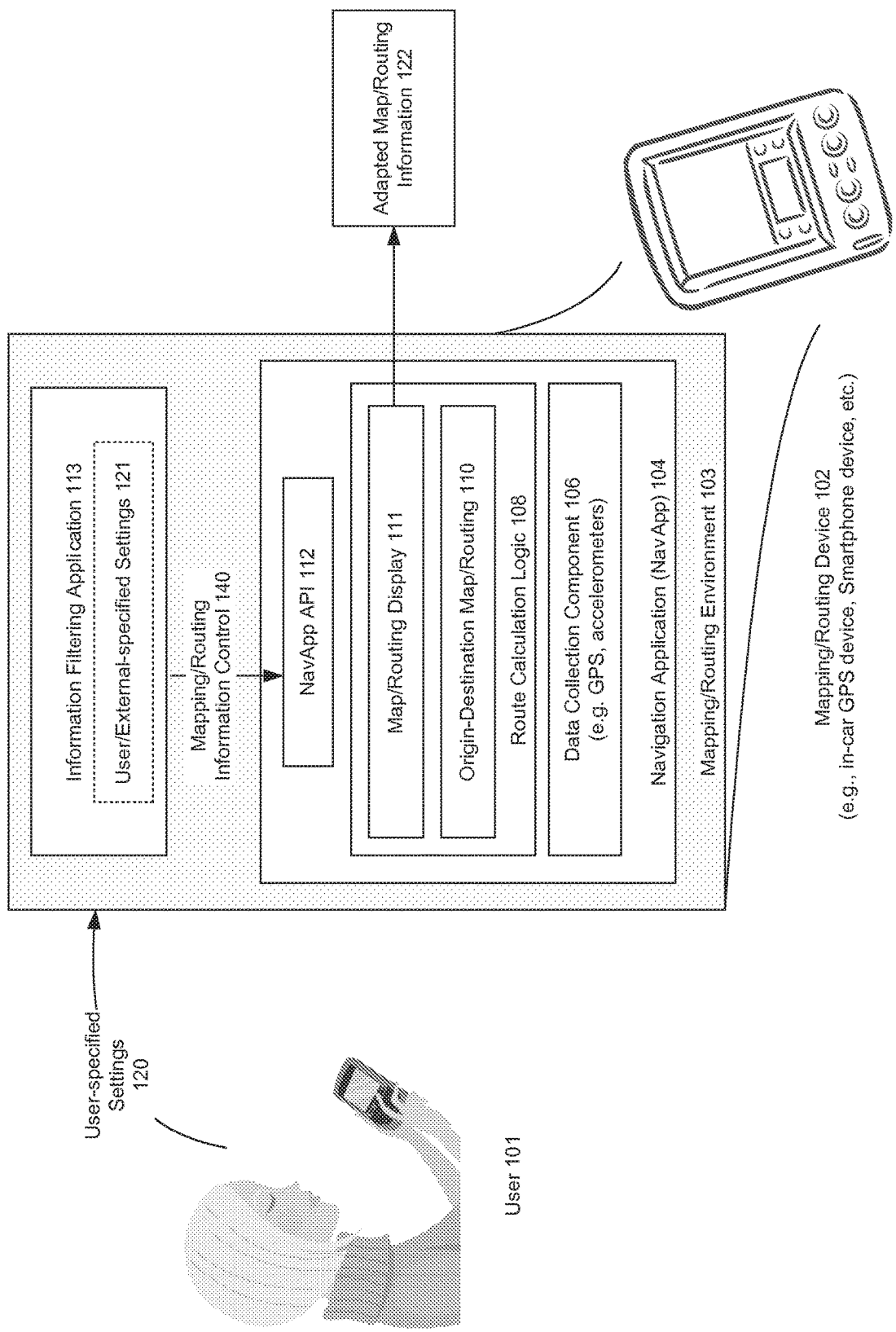
FIG. 3 illustrates a system for adapting the routing information provided by a mapping or routing device, in accordance with another embodiment.

FIG. 3 illustrates a system for adapting the routing information provided by a mapping or routing device, in accordance with another embodiment. As shown in FIG. 3, in accordance with an embodiment, the navapp can include a navapp API that enables access by third-party applications to the navapp. In such embodiments, in addition to the information filtering application operating as above to adapt the amount of map/routing information originally provided by the navapp, the information filtering application can intercept, read, or otherwise access map/routing information 140, and thereafter adapt the amount of information that will be presented by the system to a user.

Figure 4:
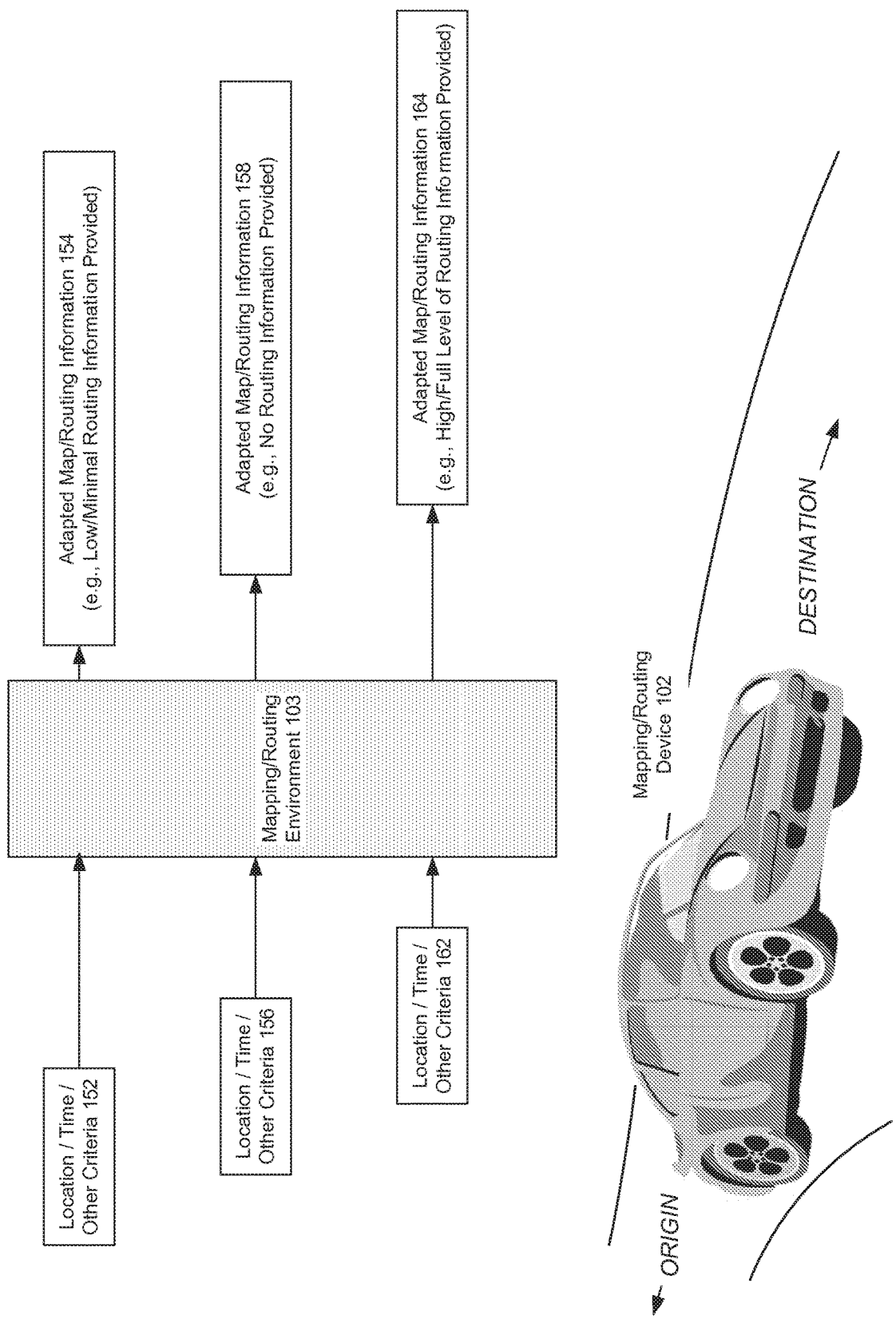
FIG. 4 illustrates the use of a system for adapting the routing information provided by a mapping or routing device, in accordance with an embodiment.

FIG. 4 illustrates the use of a system for adapting the routing information provided by a mapping or routing device, in accordance with an embodiment. As shown in FIG. 4, in accordance with an embodiment, the mapping/routing device can be provided, e.g., as an in-car GPS device for use by a driver in obtaining driving directions from an origin location to a destination location. At a particular location or moment in time 152, or based on other criteria as determined by the information filtering application configuration, the mapping/routing device can provide a particular level of adapted map/routing information 154, such as routing information turned off, with no routing information.

At a subsequent location or moment in time 156, or based on other criteria as determined by the information filtering application configuration, the mapping/routing device can provide a different level of adapted map/routing information 158, such as routing information turned on, with reduced level of routing information.

At a yet subsequent location or moment in time 162, or based on other criteria as determined by the information filtering application configuration, the mapping/routing device can provide a yet different level of adapted map/routing information 164, such as routing information turned on, with full level of routing information, or another level of adapted map/routing information.

Figure 5:
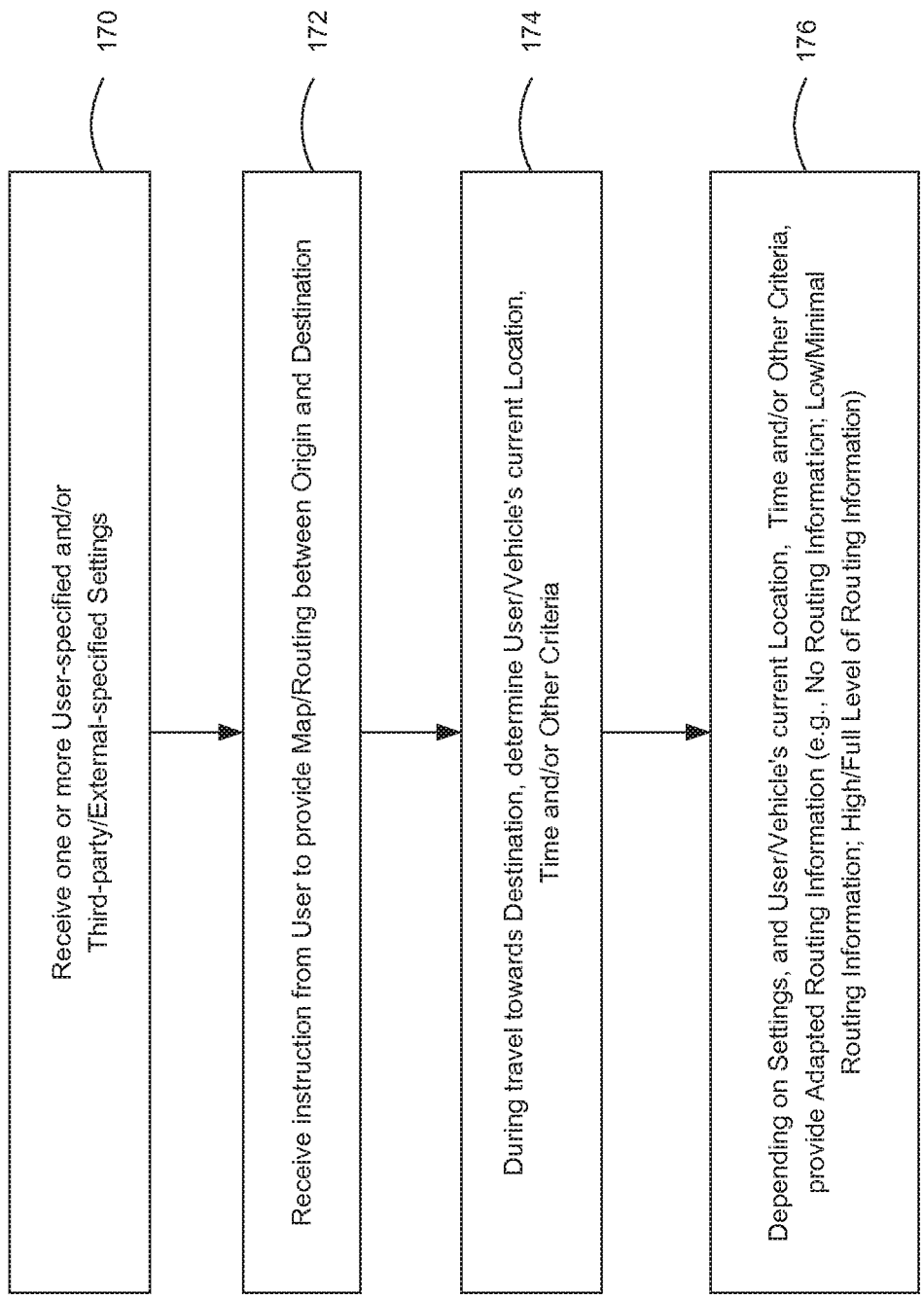
FIG. 5 illustrates a method of adapting the routing information provided by a mapping or routing device, in accordance with an embodiment.

FIG. 5 illustrates a method of adapting the routing information provided by a mapping or routing device, in accordance with an embodiment. As shown in FIG. 5, at step 170, the system receives one or more user-specified and/or third-party and/or external-specified configuration.

At step 172, the system receives an instruction from a user to provide map/routing between a first geographical location (origin), and a second geographical location (destination).

At step 174, during travel towards destination the system determines the user/vehicle's current location, time and/or other criteria.

At step 176, depending on the configuration, and the user/vehicle's current location, time and/or other criteria, the system provides an adapted map/routing information (e.g., routing information turned off, with no routing information; routing information turned on, with reduced level of routing information; routing information turned on, with full level of routing information; or another level of adapted map/routing information).

The present invention may be conveniently implemented using one or more conventional general purpose or specialized digital computers or microprocessors programmed according to the teachings of the present disclosure, or a portable device (e.g., a smartphone, PDA, computer or other device). Appropriate software coding can readily be prepared by skilled programmers based on the teachings of the present disclosure, as will be apparent to those skilled in the software art.

In some embodiments, the present invention includes a computer program product which is a non-transitory storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated.

What is claimed:

1. A computer-implemented method comprising:
    calculating, by a computer system having at least one hardware processor, a route and route guidance from an origin to a destination, the route guidance comprising textual directions to the destination;
    modifying, by the computer system, the calculated route guidance as a function of a traffic situation along the calculated route during travel of a user device between the origin and the destination, the modifying including increasing a level of detail of the textual directions of the calculated route guidance based on the traffic situation along the calculated route, the traffic situation comprising a high traffic situation; and
    causing, by the computer system, the modified calculated route guidance to be displayed on the user device.

2. The computer-implemented method of claim 1, wherein the increasing the level of detail of the textual directions of the calculated route guidance comprises increasing the level of detail of the textual directions from a first level of detail to a second level of detail, the first level of detail corresponding to presenting some, but not all, of the calculated route guidance, and the second level of detail corresponding to presenting more of the calculated route guidance than the first level of detail.

3. The computer-implemented method of claim 2, wherein the second level of detail corresponds to presenting all of the calculated route guidance.

4. The computer-implemented method of claim 1, further comprising:
    determining, by the computer system, a location of the user device during travel of the user device between the origin and the destination; and
    omitting, by the computer system, the calculated route guidance from presentation on the user device during a portion of the travel of the user device between the origin and the destination corresponding to the determined location based on the determined location of the user device.

5. The computer-implemented method of claim 4, wherein:
the modified calculated route guidance is displayed on the user device via a navigation application on the user device; and
the omitting the calculated route guidance from presentation comprises causing the navigation application to appear to have gone asleep during the portion of the travel of the user device between the origin and the destination.

6. The computer-implemented method of claim 1, wherein the user device comprises a display device configured to display the route or part of the route on a map and the modified route guidance on the map.

7. The computer-implemented method of claim 1, wherein the user device comprises an in-car global positioning system (GPS) device or a smartphone.

8. A device comprising:
at least one computer processor; and
a non-transitory computer readable medium having instructions stored thereon which, when read and executed by the at least one computer processor, cause the at least one computer processor to perform operations comprising:
calculating a route and route guidance from an origin to a destination, the route guidance comprising textual directions to the destination;
modifying the calculated route guidance as a function of a traffic situation along the calculated route during travel of a user device between the origin and the destination, the modifying including increasing a level of detail of the textual directions of the calculated route guidance based on the traffic situation along the calculated route, the traffic situation comprising a high traffic situation; and
causing the modified calculated route guidance to be displayed on the user device.

9. The device of claim 8, wherein the increasing the level of detail of the textual directions of the calculated route guidance comprises increasing the level of detail of the textual directions from a first level of detail to a second level of detail, the first level of detail corresponding to presenting some, but not all, of the calculated route guidance, and the second level of detail corresponding to presenting more of the calculated route guidance than the first level of detail.

10. The device of claim 9, wherein the second level of detail corresponds to presenting all of the calculated route guidance.

11. The device of claim 8, wherein the operations further comprise:
determining a location of the user device during travel of the user device between the origin and the destination; and
omitting the calculated route guidance from presentation on the user device during a portion of the travel of the user device between the origin and the destination corresponding to the determined location based on the determined location of the user device.

12. The device of claim 11, wherein:
the modified calculated route guidance is displayed on the user device via a navigation application on the user device; and
the omitting the calculated route guidance from presentation comprises causing the navigation application to appear to have gone asleep during the portion of the travel of the user device between the origin and the destination.

13. The device of claim 8, wherein the user device comprises a display device configured to display the route or part of the route on a map and the modified route guidance on the map.

14. The device of claim 8, wherein the user device comprises an in-car global positioning system (GPS) device or a smartphone.

15. A non-transitory computer readable medium having instructions stored thereon which, when read and executed by at least one computer processor, cause the at least one computer processor to perform operations comprising:
calculating a route and route guidance from an origin to a destination, the route guidance comprising textual directions to the destination;
modifying the calculated route guidance as a function of a traffic situation along the calculated route during travel of a user device between the origin and the destination, the modifying including increasing a level of detail of the textual directions of the calculated route guidance based on the traffic situation along the calculated route, the traffic situation comprising a high traffic situation; and
causing the modified calculated route guidance to be displayed on the user device.

16. The non-transitory computer readable medium of claim 15, wherein the increasing the level of detail of the textual directions of the calculated route guidance comprises increasing the level of detail of the textual directions from a first level of detail to a second level of detail, the first level of detail corresponding to presenting some, but not all, of the calculated route guidance, and the second level of detail corresponding to presenting more of the calculated route guidance than the first level of detail.

17. The non-transitory computer readable medium of claim 16, wherein the second level of detail corresponds to presenting all of the calculated route guidance.

18. The non-transitory computer readable medium of claim 15, wherein the operations further comprise:
determining a location of the user device during travel of the user device between the origin and the destination; and
omitting the calculated route guidance from presentation on the user device during a portion of the travel of the user device between the origin and the destination corresponding to the determined location based on the determined location of the user device.

19. The non-transitory computer readable medium of claim 18, wherein:
the modified calculated route guidance is displayed on the user device via a navigation application on the user device; and
the omitting the calculated route guidance from presentation comprises causing the navigation application to appear to have gone asleep during the portion of the travel of the user device between the origin and the destination.

20. The non-transitory computer readable medium of claim 15, wherein the user device comprises a display device configured to display the route or part of the route on a map and the modified route guidance on the map.

* * * * *